J. BERGER.
MACHINE FOR FLATTENING SEAMS.
APPLICATION FILED MAY 7, 1914.
1,279,832.
Patented Sept. 24, 1918.
4 SHEETS—SHEET 2.
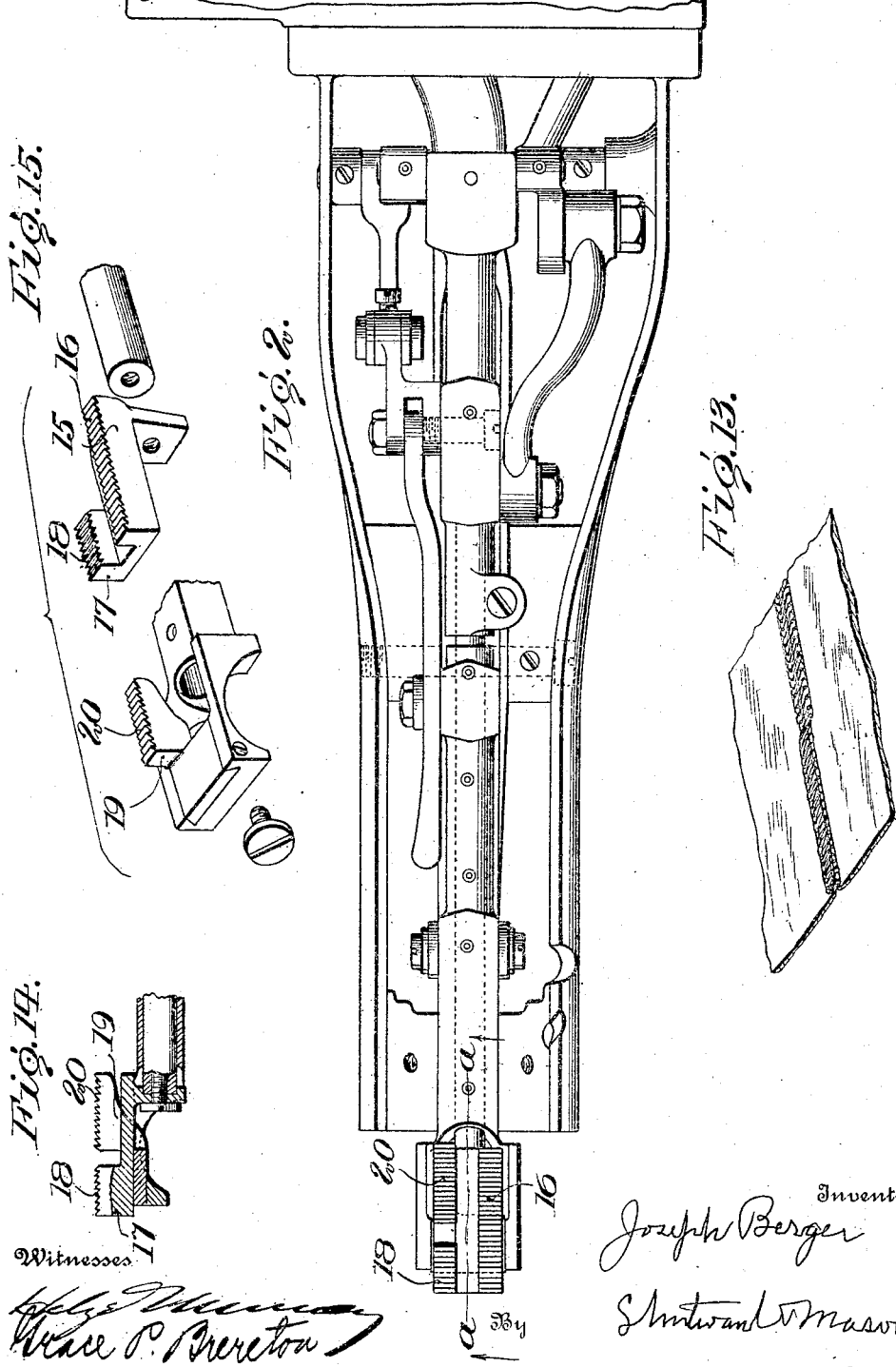

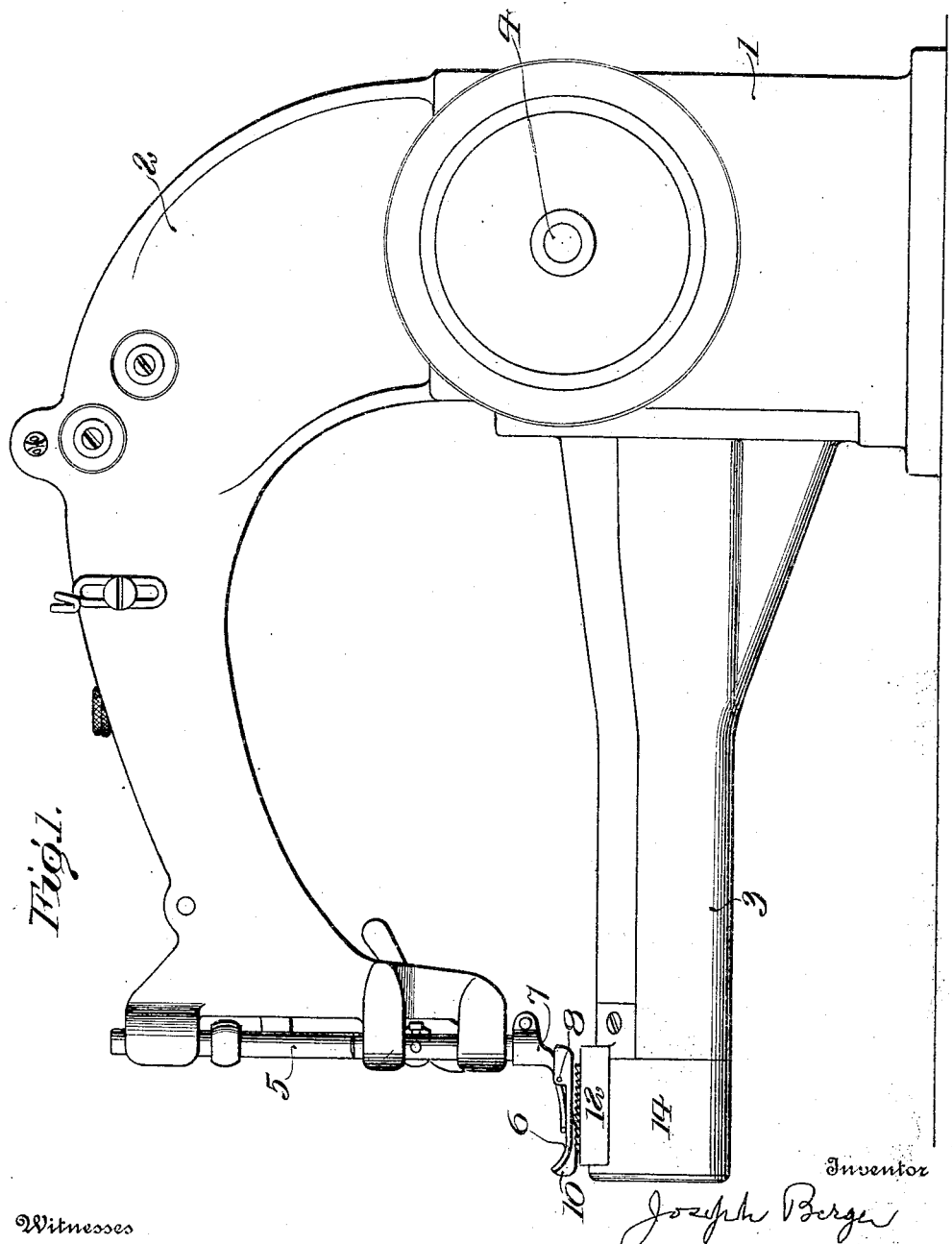

J. BERGER.
MACHINE FOR FLATTENING SEAMS.
APPLICATION FILED MAY 7, 1914.
1,279,832.
Patented Sept. 24, 1918.
4 SHEETS—SHEET 3.
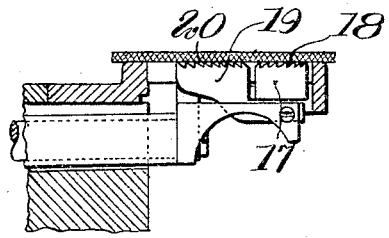
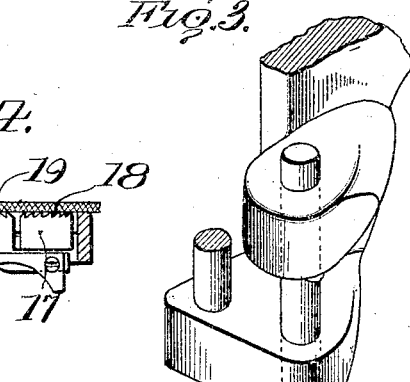
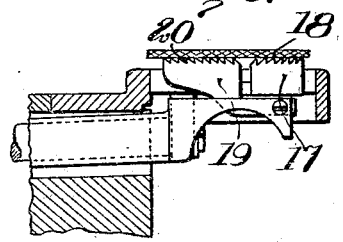
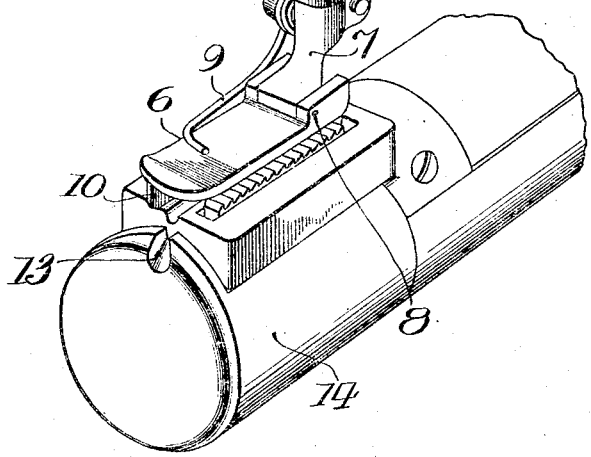
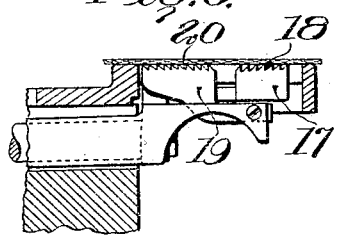
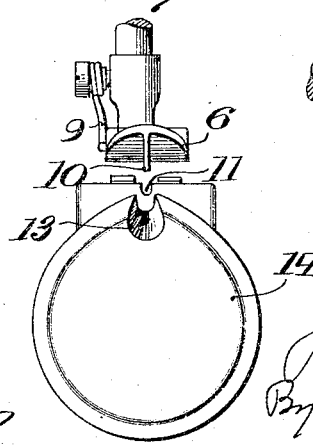
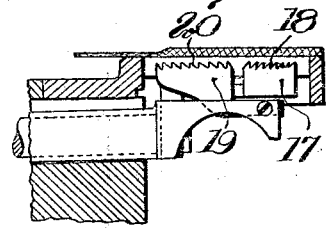
Inventor
Joseph Berger
By Sturtevant & Mason
Attorneys
Witnesses J. BERGER.
MACHINE FOR FLATTENING SEAMS.
APPLICATION FILED MAY 7, 1914.
1,279,832.
Patented Sept. 24, 1918.
4 SHEETS—SHEET 4.
Fig. 8.ª
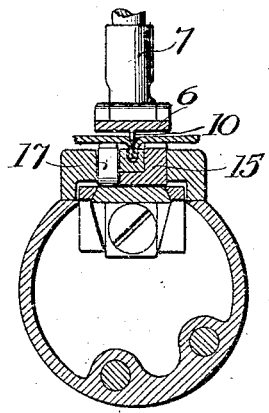
Fig. 9.
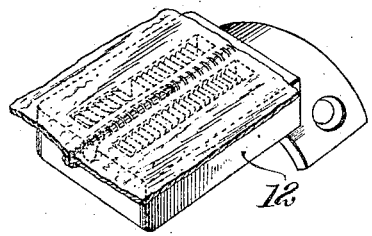
Fig. 10.
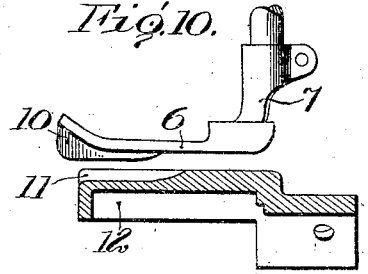
Fig. 11.
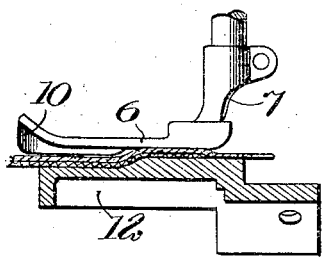
Fig. 12.
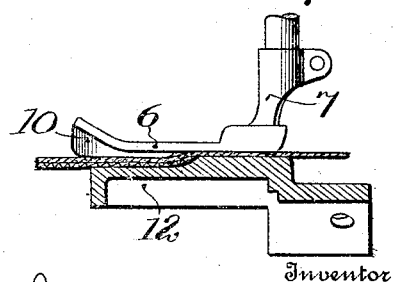
Witnesses
Inventor
Joseph Berger
By Sturtevant & Mason
Attorneys

UNITED STATES PATENT OFFICE.

JOSEPH BERGER, OF UTICA, NEW YORK, ASSIGNOR TO UNION SPECIAL MACHINE COMPANY, OF CHICAGO, ILLINOIS, A CORPORATION OF ILLINOIS.

MACHINE FOR FLATTENING SEAMS.

1,279,832.          Specification of Letters Patent.    Patented Sept. 24, 1918.

Application filed May 7, 1914. Serial No. 836,885.

*To all whom it may concern:*

Be it known that I, JOSEPH BERGER, a citizen of the United States, residing at Utica, in the county of Oneida, State of New York, have invented certain new and useful Improvements in Machines for Flattening Seams, of which the following is a description, reference being had to the accompanying drawing and to the figures of reference marked thereon.

My invention relates to improvements in machines to be used in the finishing of garments, and more particularly for the flattening out of seams on knit fabrics to do away with any objectionable ridge which may be left on the edge or at the joining seam of garments by the use in the manufacture thereof of overseaming or other stitch forming mechanism.

It is well known that in the manufacture of garments from knit fabrics when they are finally seamed, or seam covered, there is quite likely, even with the flattest seam possible on sewing machines, to be more or less of a ridge at the seam and more or less of a curl or pucker adjacent the seam. This can be remedied to some extent by the operative oppositely pulling back and forth on the goods on opposite sides of the seam, thus drawing the threads more into the goods and stretching to take out the curl.

It is the object of my invention to provide a machine which shall do this work in a simple and effective way, in simulation of the hand method above referred to, and I have in brief devised a machine of the general construction of a sewing machine having a work support and suitable presser foot mechansm, but without any stitch forming mechanism, and provided with a special construction of differential feeding mechanism, in which a main feed dog which carries the material bodily forward has a portion arranged in advance of a more rapidly moving auxiliary feed dog, and in which the teeth on that portion of the main feed dog, in advance of the auxiliary feed dog are arranged to hold back on the material, thus giving a stretching action on the fabric.

The invention also includes other features aiding in accomplishing the desired object, all as hereinafter described and referred to in the appended claims.

The invention is illustrated in the accompanying drawings, in which—

Figure 1 is a side elevation of a machine embodying my invention;

Fig. 2 is a plan view with the upper portion of the machine and the work support, cover plate and throat plate removed;

Fig. 3 is a perspective end view of the machine;

Figs. 4, 5, 6 and 7 are detail views, showing the feed dogs or fabric manipulating devices in different positions:

Fig. 8 is an end view of the work support and throat plate and presser foot;

Fig. 8ª is a cross section thereof;

Fig. 9 is a perspective detail of the throat plate with the feed dogs and fabric shown in dotted lines;

Fig. 10 is a side view of the presser foot and throat plate;

Figs. 11 and 12 are similar views, showing in the former the position of those parts and the fabric when the feed dogs are raised and moving forward, and in the latter when the feed dogs are lowered;

Fig. 13 is a perspective of the finished seam;

Fig. 14 is a section on line 14—14 of Fig. 2, looking in the direction of the arrow; and Fig. 15 is a detail of the various parts of the feed dogs or fabric manipulating devices.

In these drawings, the machine to which I have applied the mechanism for accomplishing the objects of the invention is for purposes of illustration of the type of machine known as a Union Special side wheel cylinder machine embodying a standard 1, an overhanging arm 2 and a cylindrical work support 3, so arranged that the material to be manipulated thereon is fed longitudinally of such work support. I have applied the present invention to this particular type of machine which is illustrated generally in Patent No. 583,415, granted May 25th, 1897, simply because machine heads of this character are well known on the market, but I do not wish to be understood as limiting the invention to any special character of machine.

In this machine, the feeding mechanism, which is operated from the main driving shaft 4, is shown in its entirety in the plan view in Fig. 2, and is substantially the same in its method of manipulating the feed dogs as a machine of the type above referred to, except that the feed dogs are differently arranged and have a differential movement which is obtained by any suitable mechanism.

The presser bar is indicated at 5 and carries on its lower end a presser foot or clamping device 6, which is normally controlled by the ordinary presser foot lever and spring, the foot portion proper being pivoted to its shank 7 at 8 and being normally spring-pressed by the spring 9. The underside of the presser foot has a fin or keel 10 and when the foot is in a depressed position this fin or keel 10 bears in the longitudinal slot 11 of the throat plate 12 which is attached to the work supporting plate of the machine. This throat plate 12, as herein shown extends considerably above the surface of the work support; and the slot 11 hereinbefore referred to is above and forms a practical continuation of a slot 13 in the end cap 14 of the machine. The two parts of the feed dog are shown in detail in Fig. 15, in which the main feed dog 15 is composed of an elongated portion on one side, having teeth 16, and a shorter portion 17, having teeth 18 which extend in a direction opposite to the teeth 16. The auxiliary or differential feed dog is shown at 19 and has teeth 20, which auxiliary feed dog is in the rear of and in line with the shorter portion 17 of the main feed dog 15. The differential feed dog 19 has a faster forward or feeding movement imparted to it than is imparted to the main feed dog and, therefore, gives a stretch to the fabric when acting upon it.

In Fig. 10 the positions of the presser foot and throat plate are shown when the former is raised and the material has not been inserted.

In Fig. 11 the positions are shown when the feed is raised and the material is in position, the presser foot being raised by the feed; and in Fig. 12 the positions are shown when the feed has dropped and the rear portion of the foot has dropped down on the flat portion of the throat plate and has flattened down the fabric.

Figs. 4, 5, 6 and 7 represent different positions of the feed dogs in the operation of the machine, the presser foot being removed. In the first figure, the feed dogs have been raised to engage the material; in Fig. 5 the auxiliary feed dog has started its feeding action and the oppositely inclined teeth on the short portion of the main feed dog are holding back on the material; in Fig. 6 the feeding movement is about completed, while in Fig. 7 the feed dogs have been lowered and the presser foot has dropped, showing on the left of the figure the flattening down of the fabric by the presser foot.

In Fig. 9, a detached view of the throat plate is shown with the position of the feed dogs and fabric in respect thereto shown in dotted lines.

Fig. 13 illustrates a bottom view of a piece of fabric, the left hand portion illustrating the appearance thereof before the feed has dropped and the presser foot has pressed down the fabric after manipulation by the feed dogs.

In operation, a fabric containing a seam which has been sewed on an overseaming machine, or on which the edges have been united and then covered by another seam is placed in position with the ridge portion of the seam, or the underside, as shown in Fig. 9, in the groove 11 of the throat plate, and the keel 10 of the presser foot when the latter is lowered rests in the center line of the seam, the following ridge portion of the seam being properly held and guided in the forward feeding movement of the fabric, by the groove 13 in the end cap. When the feed dogs rise the fabric is gripped between them and the presser foot clamping device. As the feed dogs move forward, the auxiliary or differential dog 19 with the teeth 20 moves faster than the main feed dog and, therefore, has a tendency to stretch the material on its side of the seam line. Furthermore, while the movement of the main feed dog progressively feeds the fabric forward, that portion 17 of the main feed dog, having the oppositely inclined teeth 18, will tend to hold back the fabric on that side of the line of seam. When the feed dogs drop and the pulling action ceases, the fabric seam is flattened down by the flat portion of the presser foot bearing on the throat plate.

It will be noticed by the arrangement of parts, the auxiliary feed in rear of a portion of the main feed on one side the central seam line acting in a sense against that portion of the main feed dog in front of it, and arranged substantially in a plane in rear of the keel 10 and slot 11, that while the portion of the main feed dog on the opposite side of the line of seam acts both in front and in rear of the plane of the two slots, will give a somewhat seesawing stretching action on the fabric and reduce the ridge which is still further flattened out by the rear portion of the presser foot and the flat portion of the throat plate clamping the stretched seam between them.

I do not wish to be limited to the details shown and described, as I believe I am the first to stretch and flatten out a seam joining the meeting edges of two fabrics by providing laterally spaced feed dogs upon opposite sides of the meeting edges of the fabric with means for imparting a differential movement to the feeds.

Having thus described my invention, what I claim as new and desire to secure by Letters Patent, is:

1. A machine for finishing garments and flattening out the seam joining the meeting edges of the two fabric sections, comprising devices engaging both of the fabric sections for feeding the same and an auxiliary device for acting on one of said sections for moving it relative to the other section to which it is joined in a direction parallel with the meeting edges of the fabric sections for flattening the seam.

2. A machine for finishing garments and flattening out the seam joining the meeting edges of the two fabric sections, comprising devices engaging both of the fabric sections for feeding the same, and means for engaging one of the fabric sections in rear of the feeding device engaging said section, for moving said section relative to the other section to which it is joined.

3. A machine for finishing garments and flattening the seam formed therein, comprising feeding devices, said feeding devices including a main feed having a portion on one side of the line of seam, and another portion on the opposite side of the line of seam, and an auxiliary feed in rear of said other portion of the main feed, and means for moving it at a more rapid rate of speed than the main feed.

4. A machine for finishing garments and flattening the seam formed therein, comprising feeding devices, said feeding devices including a main feed having a portion on one side of the line of seam and another portion on the opposite side, said line of seam, and an auxiliary feed in rear of said other portion of the main feed, means for moving it at a faster rate of speed than the main feed, the fabric engaging surfaces of the auxiliary feed and the portion of the main feed in front of it being oppositely inclined.

5. A machine for finishing garments and flattening out the seam formed by joining together the meeting edges of two fabrics, comprising laterally spaced feed dogs located on opposite sides of the meeting edges of the fabrics, means for imparting a differential movement to said feed dogs, and means for retarding the movement of the fabric in opposition to one of said feed dogs.

6. A machine for finishing garments and flattening the seam formed therein, comprising feeding devices located on opposite sides of the line of the seam, the feeding device on one side moving at a more rapid rate of speed than that on the other side, and means for holding back the fabric in advance of the more rapidly moving feeding device.

7. A machine for finishing garments and flattening the seam formed therein, comprising a main feed dog arranged on one side of the line of seam, and having a relatively short portion upon the opposite side of said line of seam, and an auxiliary feed dog arranged in rear of said relatively short portion, and means for moving it at a faster speed than the main feed dog.

8. A machine for finishing garments and flattening the seam formed therein, comprising a main feed dog arranged on one side of the line of seam, and having a relatively short portion upon the opposite side of said line of seam, an auxiliary feed dog arranged in rear of said relatively short portion, and means for moving it at a different speed from the main feed dog, said relatively short portion having its fabric engaging teeth arranged in opposition to the fabric engaging teeth on the auxiliary feed dog.

9. A machine for finishing garments and flattening the seam formed therein, including laterally spaced feeding devices on opposite sides of the line of the seam, a cloth plate having a guiding groove for the seam, a coöperating clamping device having a projection fitting in said groove, and means for imparting a differential movement to said feeding devices, one of which feeding devices lies substantially in rear of said groove.

10. A machine for finishing garments and flattening the seam formed therein, including laterally spaced feed dogs on the opposite sides of the line of seam, and means for imparting a differential movement to one of said feed dogs with respect to the other, a cloth plate having a guiding groove for the seam, a coöperating clamping device having a projection fitting in said groove, the differentially moving feed dog being arranged to operate substantially in rear of and to one side of the groove, and the other feed dog working on both sides of the groove.

11. A machine for finishing garments and flattening the seam formed therein, including laterally spaced feed dogs on opposite sides of the line of seam, and means for imparting a differential movement to one of said feed dogs with respect to the other, a cloth plate having a guiding groove for the seam, a coöperating clamping device having a projection fitting in said groove, the differentially moving feed dog being arranged to operate substantially in rear of and to one side of the groove, and the other feed dog working on both sides of the groove, that portion of the main feed dog working on the same side of the groove with the differential feed dog having fabric engaging surfaces oppositely inclined to the fabric engaging surfaces of the said differential feed dog.

In testimony whereof, I affix my signature in the presence of two witnesses.

JOSEPH BERGER.

Witnesses:
JOHN MILLER,
CHAS. B. MASON.

Copies of this patent may be obtained for five cents each, by addressing the "Commissioner of Patents, Washington, D. C."